US012407781B2

(12) United States Patent
Rosez et al.

(10) Patent No.: US 12,407,781 B2
(45) Date of Patent: Sep. 2, 2025

(54) CONFERENCE DEVICE HAVING A CONFIGURABLE CONTROL BUTTON

(71) Applicant: TELEVIC CONFERENCE, Izegem (BE)

(72) Inventors: Didier Rosez, Dadizele (BE); Bert Vangheluwe, Rumbeke (BE)

(73) Assignee: TELEVIC CONFERENCE, Izegem (BE)

( * ) Notice: Subject to any disclaimer, the term of this patent is extended or adjusted under 35 U.S.C. 154(b) by 537 days.

(21) Appl. No.: 17/782,358

(22) PCT Filed: Nov. 30, 2020

(86) PCT No.: PCT/EP2020/083881
§ 371 (c)(1),
(2) Date: Jun. 3, 2022

(87) PCT Pub. No.: WO2021/110583
PCT Pub. Date: Jun. 10, 2021

(65) Prior Publication Data
US 2023/0007125 A1     Jan. 5, 2023

(30) Foreign Application Priority Data
Dec. 6, 2019   (BE) .................................. 2019/5875

(51) Int. Cl.
*H04M 3/56*     (2006.01)
(52) U.S. Cl.
CPC ........ *H04M 3/563* (2013.01); *H04M 2250/62* (2013.01)

(58) Field of Classification Search
None
See application file for complete search history.

(56) References Cited

U.S. PATENT DOCUMENTS

2008/0270900 A1    10/2008  Wezowski
2015/0344059 A1*   12/2015  Kim ..................... B60K 35/00
                                                345/184

FOREIGN PATENT DOCUMENTS

| CN | 2701199 Y    | 5/2005 |
| CN | 101658018 A  | 2/2010 |
| CN | 102685616 A  | 9/2012 |

(Continued)

OTHER PUBLICATIONS

"Digital Congress Network: The Complete Conference Management System" May 26, 2003, retrieved from http://www.digitalcongress.co.uk/pdf/DCNdata.pdf on May 16, 2022, 102 pages.

(Continued)

*Primary Examiner* — Antim G Shah
(74) *Attorney, Agent, or Firm* — Workman Nydegger

(57) ABSTRACT

A conference device includes a physical control button having multiple underlying pressure zones; a configuration unit, adapted to visualize a number of active functions on and/or around the control button based on a chosen usage application, wherein the number is at most equal to the number of the underlying pressure zones; a control unit adapted to control one or multiple components on the conference device. The pressing of the control button at the position of one of the pressure zones results in a control which depends on the chosen usage application.

17 Claims, 6 Drawing Sheets

(56) References Cited

FOREIGN PATENT DOCUMENTS

| | | |
|---|---|---|
| CN | 109348160 A | 2/2019 |
| WO | 2007028423 A1 | 3/2007 |

OTHER PUBLICATIONS

"Communication Systems: DCNM-DE Discussion Device with Touchscreen," BOSCH, Aug. 22, 2017, retrieved from http://resource.boschsecurity.com/documents/DCNM_DE_Data_sheet_enUS_18014421940733067.pdf on May 15, 2022, 4 pages.

Software Manual, "Dicentis Conference System," BOOSCH, V1.8, Nov. 18, 2016, retrieved from http://resource.boschsecurity.com/documents/SWM_Configuration_Manual_enUS_54043208866361227.pdf on May 15, 2022, 95 pages.

User Manual, "Senator: Conference, Presentation, Meeting, Congress, Distance and Web Conference System," Xavtel, V5.04, Jan. 16, 2017, retrieved from http://xavtel.com/content/_documents/Senator_catalong_en_eu_v3.03_web.pdf on May 16, 2022, 95 pages.

Belgian Search Report from corresponding Belgian Application No. BE2019/5875, Jul. 29, 2020.

International Search Report from corresponding Application No. PCT/EP2020/083881, Jan. 27, 2021.

\* cited by examiner

CONFERENCE DEVICE HAVING A CONFIGURABLE CONTROL BUTTON

TECHNICAL AREA

The present invention generally relates to a conference device. In particular, the invention provides a solution which is flexibly configurable in function of various usage applications and also allows for a user-friendly control.

BACKGROUND OF THE INVENTION

A conference system is often used in large meeting rooms and conference rooms. Every participant disposes herein of their own conference device or conference unit, on which typically a microphone and speaker are present. Some conference devices dispose also of other features, such as a camera or a screen. Typically, a conference device contains one or multiple control buttons, by which a participant may for example activate or deactivate their own microphone, or by which a chairman of the meeting may for example mute all microphones simultaneously. Preferably, physical buttons are used for these essential functions, and not a touch screen, so that control by a participant with a visual impairment remains possible. In addition, it is often the first time that a participant or chairman has to use a certain conference device, since not all conference rooms are equipped with a same conference system. Therefore, the usage of the conference device, and in particular the function and control of the buttons, should be very self-evident, without the need of additional explanation or manual.

Conference devices are available in the state of the art which are specifically tailored for a certain type of user. Televic offers for example conference devices which are specifically designed for use by one participant, by two participants, or by a chairman of the meeting (https://www.televic-conference.com/en/products/versatile-wired-products/tabletop-units). Every type of device disposes then of specific hardware. For example, only the chairman device disposes of specific buttons allowing to simultaneously mute microphones of all participants. A device for two users disposes on the other hand of two microphone buttons, so that each of the two users can switch the common microphone on or off. Moreover, some types of devices dispose of voting buttons. Such a range of devices with specific hardware leads to increased costs for development and production for a manufacturer of conference devices and hampers the production planning. It results in increased hardware costs for owners and letters of conference systems, since devices of each type have to be purchased, and a spare device has to be available for each type of device. Also, the planning of the use of conference devices is hampered when there are several types, and flexibility is limited. For example, the suited conference device has to be moved when the chairman changes place, or devices for one user have to be exchanged for devices for two users when it turns out there are more participants than expected.

Therefore, there is a general need for conference devices wherein the same hardware can be applied in several usage applications.

Several conference devices are known in the state of the art which may be configured in function of several types of users. For example, a solution is proposed by Bosch which allows to configure a conference device as participant's post for one participant, as participant's post for two participants, or as chairman's post (https://resource.boschsecurity.com/documents/DICENTIS_Conference_Commercial_Brochure_nlNL_27-021610998623371.pdf, https://resource.boschsecurity.com/documents/UM_Operation_Manual_nlNL_9007223-133817355.pdf). The device contains two buttons, of which one button functions continuously as microphone button. Depending on the configuration, the other button serves as priority button, second microphone button or to mute the own microphone. Thus, the second button gets a specific function in a specific configuration. However, providing such a configurable button does not offer the desired flexibility to deploy the same hardware in various applications. In a certain application only one control function may be desirable because of simplicity, while in another application multiple functions have to be active on the device, for example additional voting buttons or camera buttons when a license was paid for this, or additional buttons for the chairman of the meeting. This means that a large number of control buttons is present if always the same hardware is deployed, while these remain largely unused in the most simple application. A conference device on which buttons without function are present, leads to confusion for the user, and therefore does not provide the desired self-evident control.

It is a goal of the present invention to describe a conference device, which overcomes one or more of the described disadvantages of solutions from the state of the art. More specifically, it is a goal of the present invention to describe a conference device which is flexibly configurable in function of various usage applications, and which also allows for a user-friendly control.

SUMMARY OF THE INVENTION

According to a first aspect of the invention, the above identified goal is achieved by a conference device, as defined in claim 1, comprising:
  a physical control button having multiple underlying pressure zones;
  a configuration unit, adapted to visualise on and/or around said control button a number of active functions based on a chosen usage application, wherein said number is at most equal to the number of said underlying pressure zones;
  a control unit adapted to control one or more components on the conference device,
  wherein pressing the control button at the position of one of the pressure zones results in a control which depends on the chosen usage application.

In other words, the invention relates to a conference device. A conference device is defined as a device deployed in function of communication between participants of a conference or meeting. Conference devices are for example deployed in a physical meeting in large meeting rooms and conference rooms, wherein one device is present per one or two participants of the meeting. Typically, such a conference device disposes of a microphone which may be tuned on or off by the user, and a speaker which allows the user to hear what is being said by one or more other participants. Some conference devices dispose also of other features, such as a camera, a screen, a headphone, etc. Often such conference devices are part of a conference system, wherein all devices may communicate with a central platform ensuring management of central settings, monitoring speaking time, access management, license management, etc. In another application of the conference device, the device is deployed for telephone conference conversations or conference calls, such as for example a meeting phone, conference phone, speaker phone, spider phone, sound station, etc. Such a type of conference device allows participants of a meeting to communicate with each other on distance, for example in a teleconference.

The conference device comprises a physical control button with multiple underlying pressure zones. A physical control button forms a delimited component on the device, wherein an action may be conducted such as pressing, turning, etc., and which typically interacts with present electronics such as for example deployed on a circuit board. Typically, a physical button is detectable on the device by feeling, which is not the case in a control via a touch screen. Thus, the use of a physical control button has as advantage that control by a user with a visual impairment remains possible.

The control button is one physical button. Underlying, hidden for the user, one or more pressure zones are located. The dimensions and form of the control button are such that at least two pressure zones may be present below. For example, the control button is an elongated element, wherein over the longitudinal direction of the control button two or more pressure zones are present. When the user pushes on a certain position of the control button, one of the pressure zones is pressed below. A pressure zone is designed such that as long as it is being pressed, a contact is made or broken, which may be detected by, for example, present electronics. A pressure zone has a certain size, which means that various places within this zone may be pressed to achieve the same result. There are for example multiple adjacent pressure zones present, which together have about the same size as the control button lying on top.

The conference device further comprises a configuration unit, adapted to visualise a number of active functions on and/or around the control button based on a chosen usage application. A usage application or use case may e.g. refer to the role of the user in the meeting. In a possible embodiment, a first usage application is the use of a device by one participant, and other usage applications are the use of a device by a chairman or by two participants. A usage application may also refer to certain features on the device being active or not, for example in function of specific licenses. In a possible embodiment, a first usage application is the use of only the microphone on the device, and in other usage applications a camera and/or functionalities to vote may additionally be used. Which usage application applies for a device may be chosen, for example via a central platform or on the conference device itself. The chosen usage application may be stored on the conference device and/or may be stored by the central platform.

The configuration unit is adapted to visualise certain active functions depending on which usage application is chosen. For example, when the device is configured as chairman's post, a function becomes visible on the button to simultaneously mute all microphones. In another example, in a usage application with possibility of voting, voting options become visible on the button, or in a usage application with camera usage, functions become visible to switch the camera on or off. The visualisation on the control button occurs for example by means of pictograms lighting up or by means of certain lamps above, under or around a control button lighting up. The visualisation of active functions on and/or around the control button shows the user at which location of the control button he should press to perform a certain active function.

The number of visualised active functions is at most equal to the number of underlying pressure zones. In a certain chosen usage application, an active function is for example shown at the position of each underlying pressure zone. In another chosen usage application, less active functions are shown than there are pressure zones. For example, only one active function is visualised on the button.

Furthermore, the conference device comprises a control unit adapted to control one or more components on the conference device. Components on the device, which may be controlled, are for example a microphone which may be switched on or off, a camera which may be switched on or off or may be directed in a certain way, a screen or touch screen which may be switched on or off or on which certain things may be shown, LEDs or lamps which may light up, etc. The control unit is adapted to control one or more of such components, which means that the necessary connections and electronics are present to for example switch on a microphone, change direction of a camera, light up LEDs, etc.

Pressing the control button at the position of one of the pressure zones results in a control which depends on the chosen usage application. This means that, depending on which usage application is chosen, pressing a pressure zone may have a different effect. This may for example mean that pressing a pressure zone result in controlling other components, depending on the usage application, or this may mean that, depending on the usage application, a component may be controlled in a different way. For example, pressing a pressure zone in a usage application as "single user" results in switching on the microphone and directing a camera centrally, while pressing that same pressure zone in a second usage application as "dual use" results in switching on the microphone and directing the camera to the left person. In another example, it is also possible that no direct effect on the device follows from pressing the pressure zone. For example, pressing a pressure zone in a usage application as "chairman" may result in sending a signal to simultaneously mute all microphones, but without controlling a component on the chairman's device itself.

In a possible embodiment, pressing a pressure zone results in a direct control of components by the control unit. However, in another embodiment, there is no such direct control present. Pressing a pressure zone results for example in sending a signal from the control unit to a central platform, after which the latter sends a signal back after interpretation of the signal, resulting in controlling a component on the device. In an embodiment, the signal sent by the control unit may contain solely information about which pressure zone was pressed, or, in another embodiment, this signal may already contain information based on the chosen usage application.

In certain usage applications an active function is visualised at the position of each pressure zone. Typically, pressing a pressure zone results in such cases in a control which corresponds with the visualised active function. On the other hand, in other usage applications pressure zones may be present at the position of which no active function is visualised on the control button. In such cases, the control resulting from pressing the pressure zone may for example be the same as the control following pressing a neighbouring pressure zone. Finally, it is also possible in an embodiment that in two different usage applications a same active function is visualised, for example a microphone symbol, while the control following from it will anyhow be different, for example switching the microphone on and directing the camera in one usage application, and only switching the microphone on in another usage application.

The conference device according to the invention results in several advantages. First, this conference device allows to use the same hardware in various usage applications. In this, not only the function of a pressure zone may be configured depending on the usage application, but also the number of active functions may be varied depending on the usage application. For a manufacturer of conference devices, the use of the same hardware for various conference system results in reduced costs for development and production, and a simpler production planning. For owners and lessors of conference systems, it results in reduced purchase costs and an easier planning of the usage of conference devices. Moreover, a conference device may be changed to another usage application in a very flexible manner, for example when the chairman changes place or a device has suddenly to be deployed for two users instead of for one user.

Another advantage of the conference device according to the invention is that a user-friendly control is obtained in each of the various usage applications. Users are guided in where on the control button they have to press to perform certain functions, without the need of multiple physical buttons. If there is only one active function, this may be visualised centrally on the control button, and each of the underlying pressure zones may result in the same control. In that way, the user sees one physical button, which has only one function. In case of multiple active functions, their visualisations may be distributed evenly over the control button, so that it is immediately clear for the user where on the control button they have to press in order to perform a certain function. As a result, users are never confused by the presence of buttons which do not have any function in certain usage applications. This results in a self-evident control of the conference device, even if someone is using the device for the first time.

Finally, this invention offers as an advantage that, in spite of various configuration possibilities, a streamlined and sleek design of the conference device remains possible, since only one physical control button is visible.

Optionally, as defined by claim 2, the number of active functions varies between one and the number of underlying pressure zones, depending on the chosen usage application. This means that amongst the usage applications which may be chosen, there is at least one usage application in which the number of active functions is one, and at least one usage application in which the number of active functions is the same as the number of underlying pressure zones. In the first case there is for example one pictogram central on the button lighting up, in the second case there may be multiple pictograms evenly distributed over the button lighting up. In any case the user is guided in where on the control button they have to press, without multiple physical buttons being visible. This contributes to a user-friendly control, for various usage applications.

Optionally, as defined by claim 3, multiple pictograms are provided on the control button, and visualising the active functions comprises lighting up of a respective selection of pictograms. This means that a series of pictograms is provided on the control button which symbolise the various functions being available throughout all usage applications. After choosing the usage application, some of the pictograms are illuminated while other pictograms remain invisible. The pictograms are for example applied in the material of the button by a laser technique, and LEDs under the control button take care of the lighting up of pictograms. The usage of pictograms on the control button and their selective illumination results in very clear indications for the user where to press. This contributes to a good user-friendliness of the conference device.

Optionally, as defined by claim 4, the pictograms are not visible when they do not light up and lighting up of the selection of pictograms results in making the selection of pictograms visible. Typically, none of the pictograms is visible for the user in a switched off conference device. After switching the device on and choosing the usage application, some of the pictograms are illuminated, so that they become visible for the user. The pictograms are for example applied in the material of the button via a laser technique, and LEDs under the control button take care of the lighting up of pictograms, wherein one LED per pictogram is provided. In this way, a pictogram is not visible for the user when the corresponding LED is not on. When a certain usage application is chosen, a selection of LEDs is turned on, and corresponding pictograms become visible, which are representative for the active functions in that usage application. This results in very clear indications for the user where to press, while he cannot be distracted by pictograms of inactive functions. This contributes to a good user-friendliness of the conference device.

Optionally, as defined by claim 5, the pictograms are positioned such that the selection of pictograms lighting up is distributed evenly over the control button. An even distribution of the illuminated pictograms means that for example one pictogram centrally on the control button is illuminated, or one pictogram on the left side of the button and one pictogram on the right side of the button, or three pictograms with an even spacing, etc. An uneven distribution would for example be the case when all illuminated pictograms are located at one extreme end of the control button. An even distribution of the illuminated pictograms has as an advantage that a user is guided in where to press on the control button, while being shielded from the underlying complexity of the multiple present pressure zones.

Optionally, as defined by claim 6, one or more pictograms are provided on said control button at the position of a pressure zone, and the configuration unit is adapted to light up one or none of the pictograms at the position of the pressure zone based on the chosen usage application. This means that at least one pictogram is present on the control button at the position of a specific pressure zone, so there is at least one usage application in which this pressure zone is used for a specific control. The control button may also contain multiple pictograms at the position of on specific pressure zone, so that, depending on which usage application is active, another control results from pressing that pressure zone. The presence of one or multiple pictograms at the position of each pressure zone does however not mean that pictograms on the control button at the position of the pressure zone are always visible for the user. Which pictograms light up, and thus become visible for the user, depends on the chosen usage application. Depending on the chosen usage application, there is either one pictogram lighting up per pressure zone, representative for the active function of that pressure zone, or there are one or multiple pressure zones above which no pictogram is lighting up. This has as advantage that when there are less active functions than pressure zones, the user is only presented with the active functions, and is shielded from the underlying complexity of the multiple present pressure zones.

Optionally, as defined by claim 7, in the case that no pictogram lights up at the position of a pressure zone, the control resulting from pressing this pressure zone is the same as the control resulting from pressing a neighbouring pressure zone. For example, in a conference device with two pressure zones, only one microphone symbol is visualised centrally on the control button in case of a usage application as "single user", while pressing each of the pressure zones results in switching on of the microphone. This has as advantage that only one physical button is visible for the user, which also serves for only one function independent from where it is pressed. This contributes to an improved user-friendliness of the device.

Optionally, as defined by claim 8, the conference device is adapted to communicate with a central unit. This means that the conference device contains electronic parts which allow for the communication with a central unit, for example via a wired or wireless connection. A central unit is for example a device or central platform which is in connection with all conference devices which are part of the conference system. Typically, the central unit allows for a number of functionalities, such as management of participants, license management, access management, monitoring speaking time, etc. The presence of the central unit may also allow for conference devices to communicate with each other, via the central unit.

Optionally, also according to claim 8, the control unit is adapted to send a request to the central unit when pressing the control button at the position of one of the pressure zones. This means that, after detection of the pressing of a pressure zone, a signal is sent from the conference device to the central unit, wherein this signal comprises a request. A request comprises for example a demand from the conference device to switch the microphone on or indicates only which pressure zone was pressed, The central unit may then interpret the request, and for example only allow the switching on of the microphone if the maximum number of allowed speakers has not been reached, if the system is set in this way by the user. Thus, in this example, the request from the control unit results in a control on the conference device, but with intervention of the central unit. In another example, the request may also result in actions which occur at the central unit, such as measuring speaking time or monitoring who is talking. In yet another example, a request may also result in a control on other conference devices, such as when the chairman presses the mute button, and signals are then sent from the central unit to mute all devices. Providing a control unit adapted to send a request has as advantage that more functionalities become possible than when a control unit may only control components on the device itself.

Optionally, as defined by claim 9, the content of the request is based on the chosen usage application. This means that the content of a request does not solely indicate which pressure zone was pressed but depends on which usage application was chosen. This implies that a conference device knows its usage application, for example because this is stored on the device or because it may be requested from the central unit. In a possible embodiment, the request comprises information about which pressure zone was pressed together with the chosen usage application. In another embodiment, the control unit already interprets which pressure zone was pressed and which usage application is active, resulting in a request which comprises for example the request for switching on the microphone.

Optionally, as defined by claim 10, the control unit is adapted to receive a command from the central unit, based on which one component or multiple components are controlled. This means, that a signal is sent from the central unit to the conference device, resulting in the control of certain components on the device. The command may for example be an answer from the central unit to the request sent by the conference device, for example, the central unit allows the microphone to switch on. In another example, a command is an answer to a request from another conference device, such as in the case that a chairman presses the button to mute all present devices. Providing a control unit adapted to receive a command has as advantage that more functionalities become possible than when a control unit may only directly control components on the device itself.

Optionally, as defined by claim 11, the configuration unit is adapted to receive a configuration message from the central unit, wherein the configuration message comprises the chosen usage application. This means that choosing the usage applications may occur via the central unit, and that this choice is then sent to the conference device in a configuration message. In another embodiment, the possibility also exists, apart from choosing the usage application via the central unit, to choose the usage application on the conference device itself. The use of a configuration message from the central unit has as advantage that a larger amount of devices may be configured in a fast and simple way via the central unit.

Optionally, as defined by claim 12, the one or more components belong to the following group: microphone, illumination component, screen, camera, motor. A microphone is a device adapted to convert sound to an electric signal, an illumination component is for example a lamp or LED, a screen is for example a display or touch screen, a camera is a device adapted to make a picture recording, for example in digital form, a motor is for example used to change the direction of the camera, for example in function of which of the two users is speaking.

Optionally, as defined by claim 13, the number of underlying pressure zones is equal to two, and the number of the pictograms is equal to five, of which two are provided at the left side of the control button, to at the right side of the control button, and one centrally on the control button. In a possible embodiment, when a usage application is chosen with only one active function, the pictogram centrally on the control button will light up, while in a usage application with two active functions a pictogram at the left side and a pictogram at the right side light up.

Optionally, as defined by claim 14, the chosen usage application is representative for a usage of the conference device by one participant, or a usage of the conference device by two participants, or a usage of the conference device by a chairman. In a typical conference the meeting is chaired by a chairman, while the other participants are regular participants. Said usage applications allow to configure the conference device according to the role the user has in the meeting. The chair disposes for example over the function to mute all microphones simultaneously, while a participant does not have this function. A conference device may also be configured according to the number of users. For example, in case of two users, two functions become active to switch the microphone on, by each of the users, or the camera will be directed to the user speaking.

Optionally, as defined by claim 15, the configuration unit is adapted to light up one pictogram centrally on the control button upon use by one participant, and to light up one pictogram at the left side and one pictogram at the right side of the control button upon use by two participants or a chairman. This means that in case of usage by one participant, one pictogram centrally on the control button will light up, and in case of use by two participants or a chairman, one pictogram at the left side and one pictogram at the right side of the control button will light up. A single user has for example only the possibility to control the microphone, which is visualised by a pictogram centrally on the control button. For example, with a device configured for two users, each user has the possibility to control the microphone, via pressing the left or right side of the control button, respectively. For example, a device configured as chairman's device has, apart from the function to control its own microphone, also the function to mute all other microphones, visualised via pictograms at the left and right side of the control button, respectively.

DETAILED DESCRIPTION OF THE EMBODIMENTS

Figure 1:
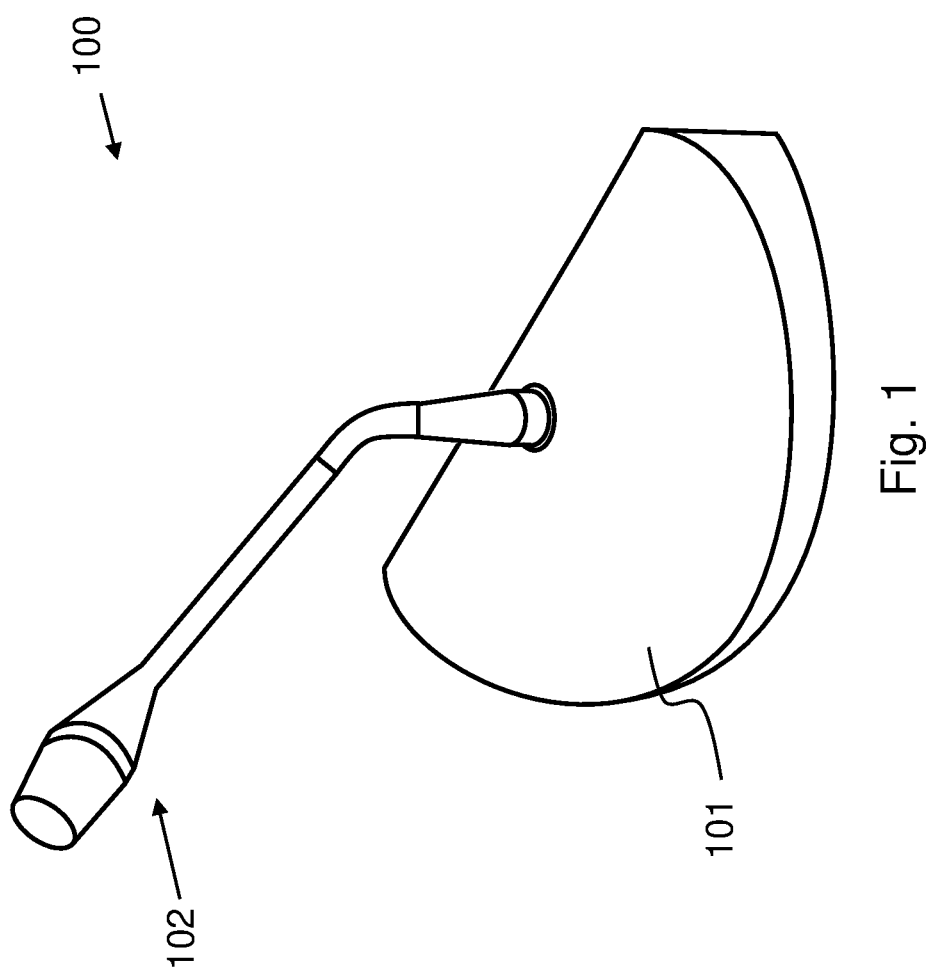
FIG. 1 gives a 3D-presentation of a conference device according to the invention.

FIG. 1 gives a 3D presentation of a conference device 100 comprising a microphone 102 and base 101. The embodiment of FIG. 1 shows a conference device 100 as it is typically deployed in physical meetings in large meeting rooms and conference rooms, wherein one conference device 100 is present per one or two participants of the meeting. In another possible embodiment, the conference device 100 may also contain a camera in addition to the microphone 102. There are also embodiments of the conference device possible, which are adapted for use in a teleconference, wherein participants meet with each other remotely. The conference device 100 then takes the form of for example a meeting phone, conference phone, speaker phone, spider phone, sound station, etc.

Figure 2:
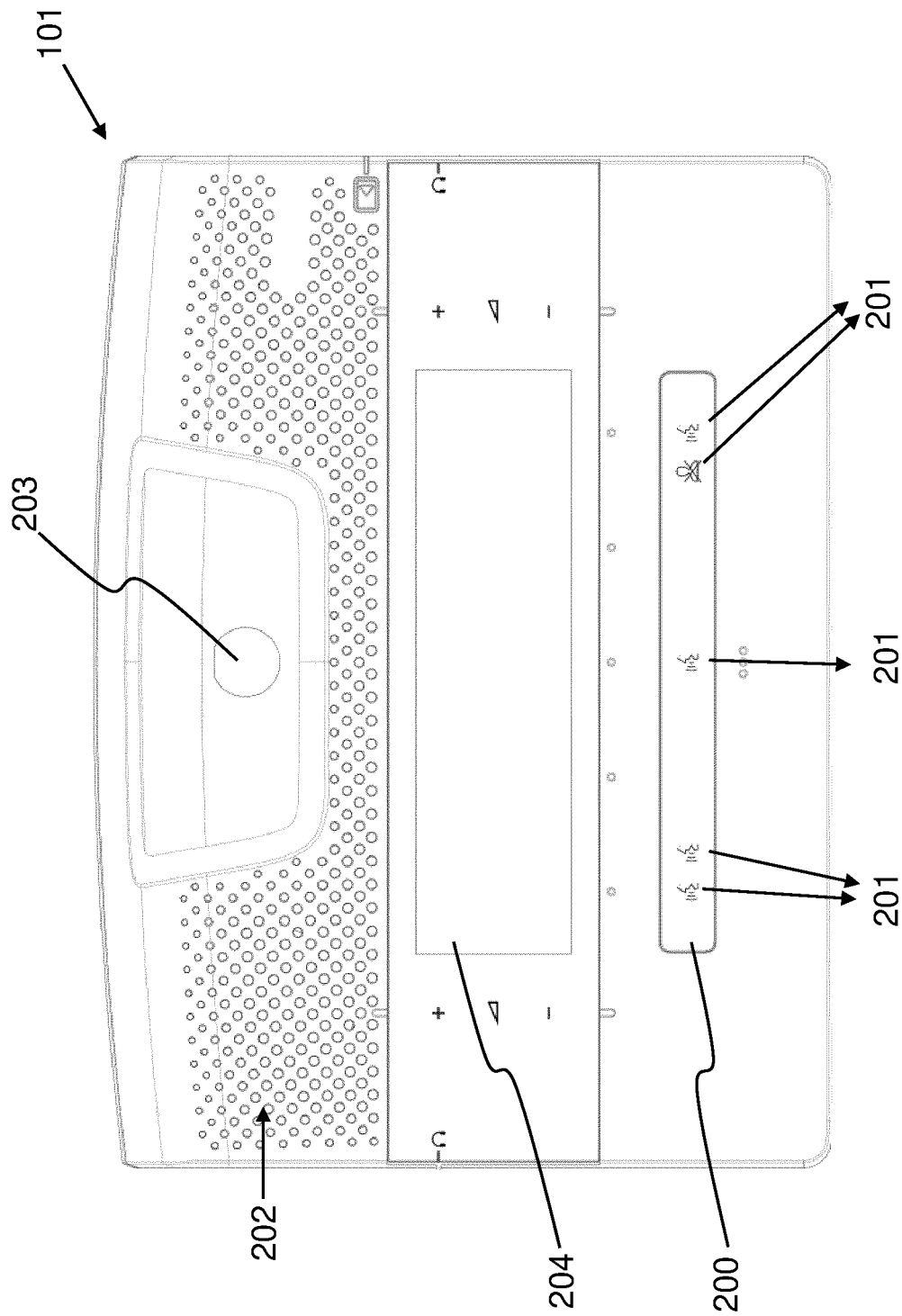
FIG. 2 shows a base of a conference device according to the invention.

FIG. 2 shows a base 101 according to an embodiment of the invention. The base 101 comprises a connector 203 for a microphone 102, a screen or touch screen 204, and a physical control button 200. The screen 204 allows for example to visualise things, such as speaking time per participant or voting results, or may also allow for certain functionalities, such as for example casting of a vote by a participant. The control button 200 is a push button with elongated shape and contains a number of pictograms 201 which are representative for the possible active functions.

In the embodiment of FIG. 2, the control button 200 contains a polycarbonate top glued to a PC/ABS (polycarbonate/acrylonitril butadiene styrene) support. The polycarbonate top side is a transparent material which is printed with black on the bottom side. Pictograms 201 are cut out in the black printing. At the bottom side of the polycarbonate piece, a white diffuser may be arranged at the position of the cut-out pictograms.

Figure 5:
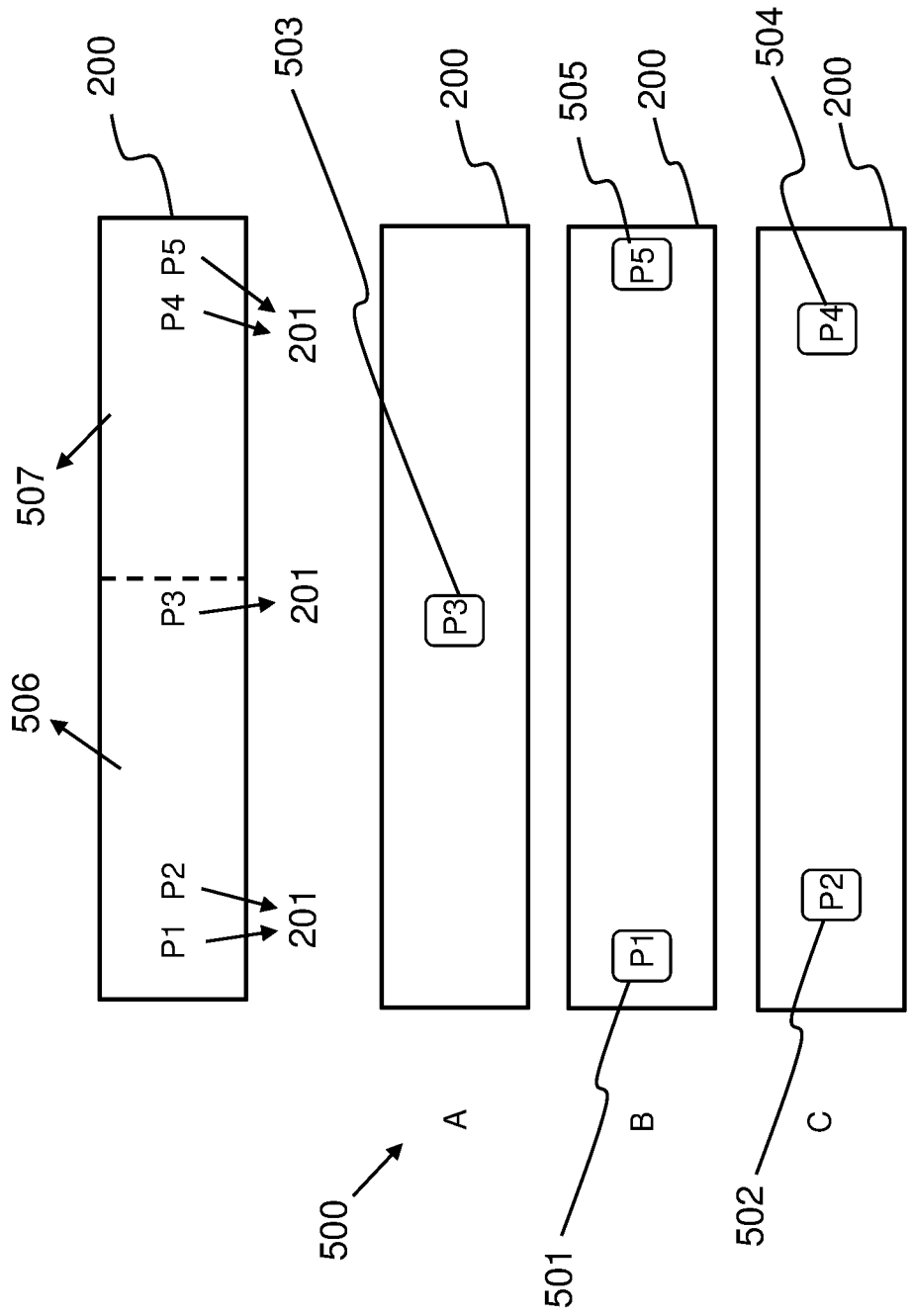
FIG. 5 shows a possible embodiment of a control button according to the invention, and illustrates its appearance in various usage applications.

In the embodiment of FIG. 2, two pressure zones 401 are present below the control button 200. The pressure zones 401 are not visible in FIG. 2, but they are schematically depicted in FIG. 5. The pressure zones 401 are for example designed as a silicone keypad, in which two actuators are incorporated. The control button 200 lies in this silicone keypad and pressing the control button 200 at a certain side makes one of the actuators contact a circuit board, short-cutting copper wires on the circuit board.

In the embodiment of FIG. 2, the base 101 contains LEDs, which are arranged within the housing of the base 101. At lighting up of one of the LEDs, light shines through one of the cut-out pictograms 201, optionally through a white diffuser. This results in lighting up of the respective pictograms. None of the LEDs is switched on in a switched off device, and therefore none of the pictograms 201 is visible for the user. In a switched-on device and after choice of the usage application, a selection of LEDs turns on, so that a corresponding selection of pictograms 201 lights up. The remaining pictograms do not light up and remain invisible to the user. The pictograms 201 lighting up visualise to the user the functions which are active in the chosen usage application. Thus, the active functions are visualised on the control button 200, which allows for a self-evident control by the user. On the other hand, the inactive functions are not visible to the user, so that he is not distracted by pictograms or buttons which are not active to him. Note that in FIG. 2 five pictograms 201 are presented on the figure to show which pictograms 201 are present. However, in use, only a selection of these five pictograms is visible to the user.

The LEDs illuminating the pictograms 201 in the button 200 are for example multicolour LEDs, so that the pictograms 201 may light up in a specific colour. For example, a pictogram 201 is illuminated in a colour which is the same as the colour of a LED ring in the microphone 102. A speak pictogram on the button 200 may for example colour red if the microphone 102 is activated, or green if the speaker is in a queue. If necessary, the pictogram may also flash in case the speaker is the next to speak. It is also possible to swap the red and green colours, wherein green is for example used to indicate that the microphone is switched on.

Other embodiments of the conference device 100 and the control button 200 are also possible, for example wherein icons are cut out in the housing above the control button 200 and a lamp turns on at an icon when the corresponding function is active.

Figure 3A:
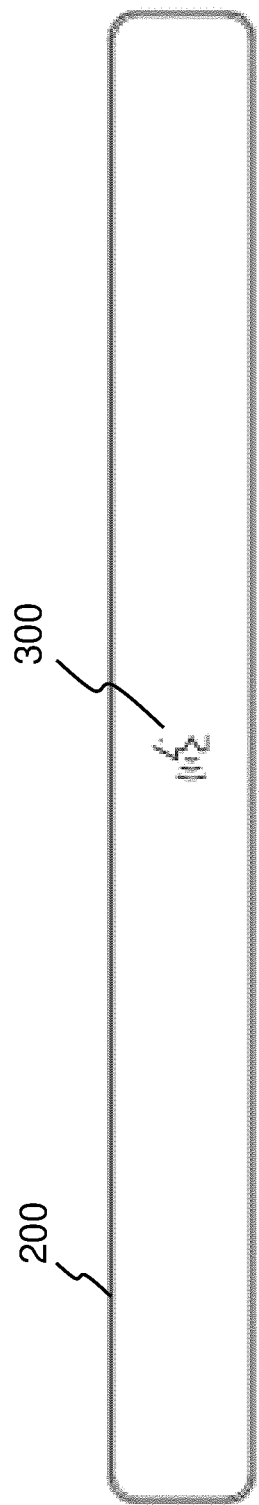
FIGS. 3a to 3c illustrate the appearance of the control button from FIG. 2 in various usage applications.
Figure 3B:
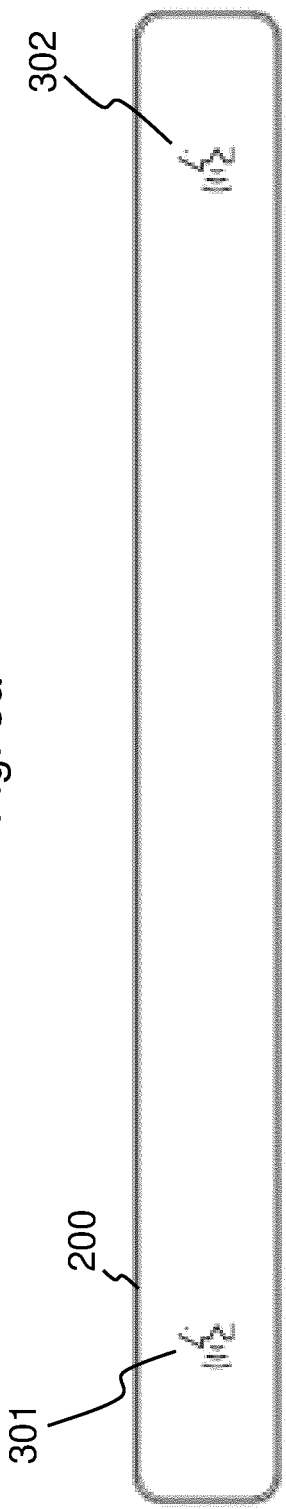
Figure 3C:
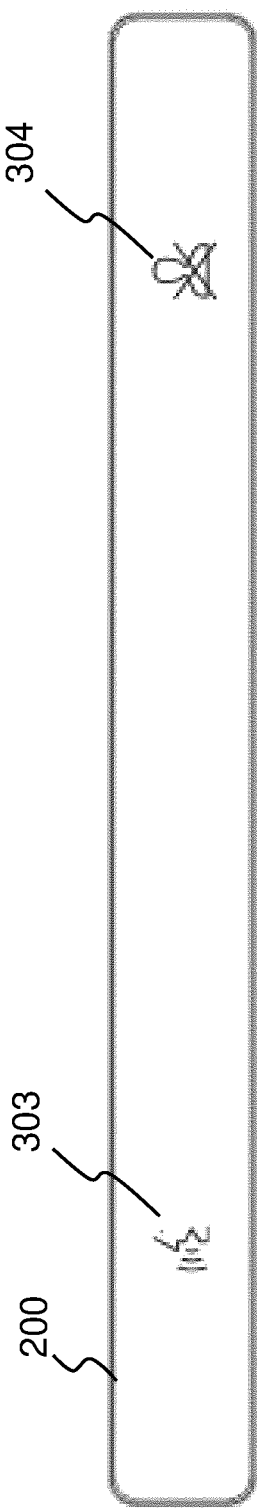

FIGS. 3a to 3c illustrate furthermore the appearance of the control button 200 in switched on device and various usage applications. FIG. 3a illustrates the view of the control button 200 in a usage application representative for a use by one participant. When this usage application is chosen, only the speak pictogram 300 centrally on the control button 200 is illuminated. Therefore, it is immediately clear to the user that there is only one active function, namely controlling the microphone. In the embodiments of FIGS. 2 and 3a to 3c, pressing one of the pressure zones 401 results in the same function, namely controlling the microphone. Thus, only one button is visible to the user, which independently from where it is pressed always has the same function. The user is in this way shielded from the underlying complexity of multiple present pressure zones 401.

FIG. 3b illustrates the view of the control button 200 in a usage application representative for a usage by two participants. When this usage application is chosen, two speak pictograms 301 and 302 light up. Since both pictograms 301 and 302 are shown at opposing ends of the control button 200, it is immediately clear to the user that pressing the control button left or right, respectively, results in controlling the microphone by the left or right user, respectively.

FIG. 3c illustrates the view of the control button 200 in a usage application representative for a usage by a chairman. When this usage application is chosen, a speak pictogram 303 and a mute pictogram 304 light up. Since both pictograms 303 and 304 are shown at opposing ends of the control button 200, it is immediately clear to the user that pressing the control button 200 at the left side results in controlling the own microphone and pressing the control button 200 at the right side results in simultaneously muting all participant microphones by the chairman.

Figure 4:
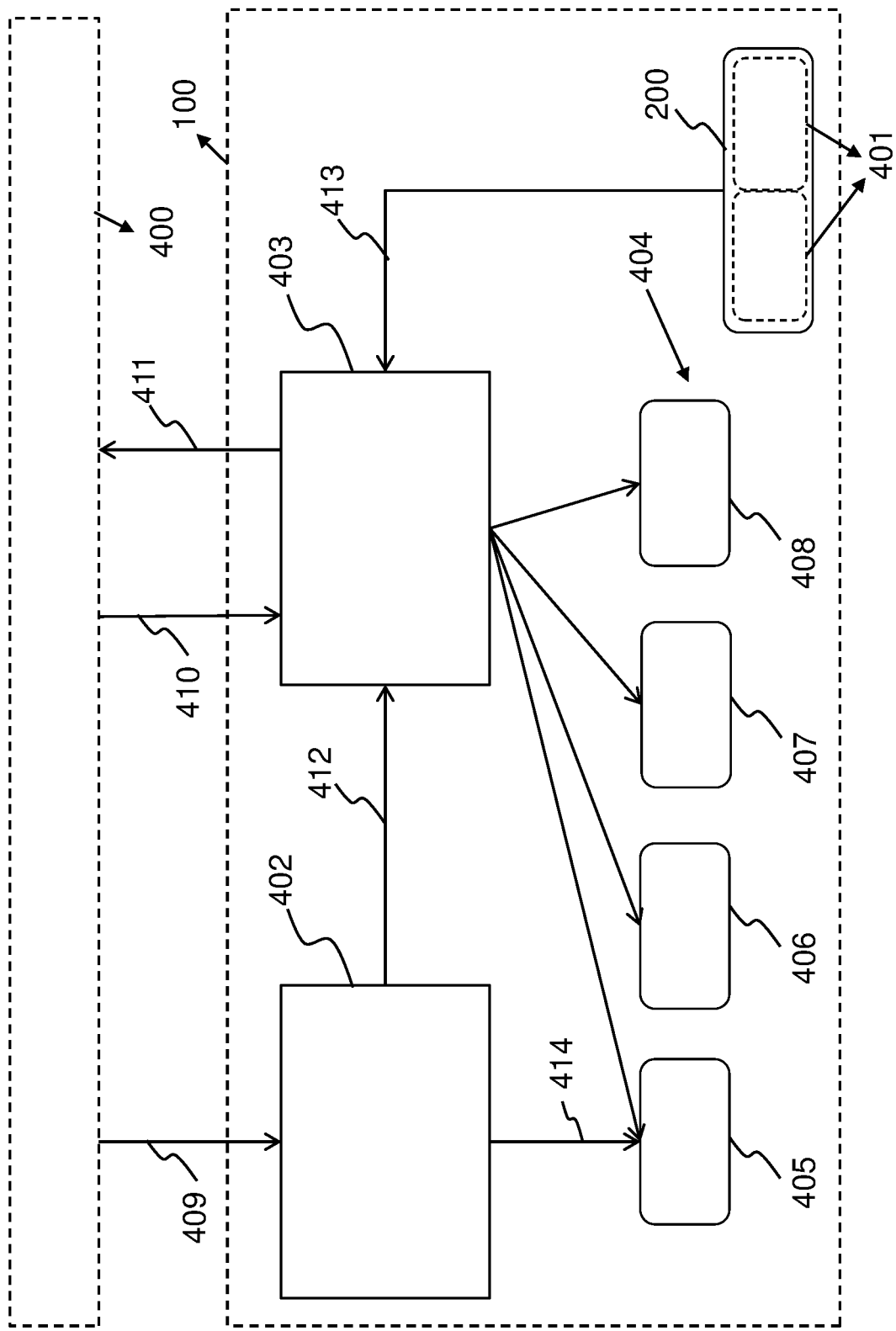
FIG. 4 gives a block diagram of a central unit and a conference device according to the invention.

The block diagram of FIG. 4 illustrates how, within a possible embodiment of the invention, various components of a conference device 100 communicate with each other, and how the conference device 100 communicates with a central unit 400. The conference device 100 is herein part of a conference system, wherein all devices may communicate with a central unit 400. A central unit 400 is for example a device or central platform which is connected with multiple conference devices 100, for example via a wired or wireless connection. The central unit 400 and conference devices 100 dispose for example over a transceiver to exchange signals with each other. The central unit 400 has typically multiple functionalities, such as organising the control of the conference devices 100, management of participants, license management, access management, monitoring speaking time, etc.

The conference device 100 comprises a control button 200 with two underlying pressure zones 401, and a number of components 404. In the embodiment of FIG. 4, the conference device 100 contains for example LEDs 405, a microphone 406, a camera 407 and a screen 408. The conference device 100 comprises furthermore a configuration unit 402 and a control unit 403.

In the embodiment of FIG. 4, a software application allows the central unit 400 to choose a usage application. The chosen usage application is sent to the configuration unit 402 in a configuration message 409. The configuration unit 402 is adapted to visualise the right active function on the control button 200 based on the chosen usage application. FIG. 4 illustrates that the configuration unit 402 is adapted to make a selection of LEDs 405 light up, such as indicated by the arrow 414. Prompting a selection of LEDs 405 to light up results in illuminating certain pictograms 201 which are cut out in the button 200. These pictograms 201 are for example presented in FIG. 2. The chosen usage application is for example stored by a memory component which is part of the configuration unit 402. In another embodiment it is however also possible that choosing the usage application happens on the conference device 100 itself, without exchanging a configuration message 409.

When one pressure zone 401 is pressed, this is detected by the control unit 403 via a signal 413. In the embodiment of FIG. 4, this results subsequently in sending a request 411 to the central unit 400. The content of the request 411 is composed based on which pressure zone 401 was pressed, and based on the stored usage application, see 412. For example, in a usage application as only user, a request is sent to switch the microphone on at pressing the right pressure zone, and in a usage application as chairman, a request is sent to mute all other microphones. In another embodiment, it is also possible that the request 411 solely contains an indication of the pressed pressure zone and the usage application, without translating this already in a desired function to be performed. Sending a request 411 may also result in performing actions on the central unit 400, such as for example measuring speaking time or monitoring who is speaking.

In the embodiment of FIG. 4, the control unit 403 is also adapted to receive a command 410 from the central unit 400. The command may for example be a response of the central unit 400 on a request 411 sent by the conference device 100. The central unit 400 gives for example permission to switch the microphone on if the maximum number of allowed speakers has not been reached yet, or when the maximum time for the usage by two participants according to a license has not been reached yet. In another example a command is a response on a request from a different conference device, such as in the case a chairman presses the button to mute all present devices.

In the embodiment of FIG. 4, one or more components 404 are controlled on the conference device 100 based on the received command 410. For example, the microphone 406 is switched on or off, LEDs 405 are switched on, optionally in another colour, a camera 407 is switched on or off or directed in a certain way, a screen 408 is switched on or off or things are shown, etc. In another embodiment it is however also possible that components 404 are controlled directly by the control unit 403 based on the detected pressed pressure zone, without intervention of a central unit 400.

Figure 6:
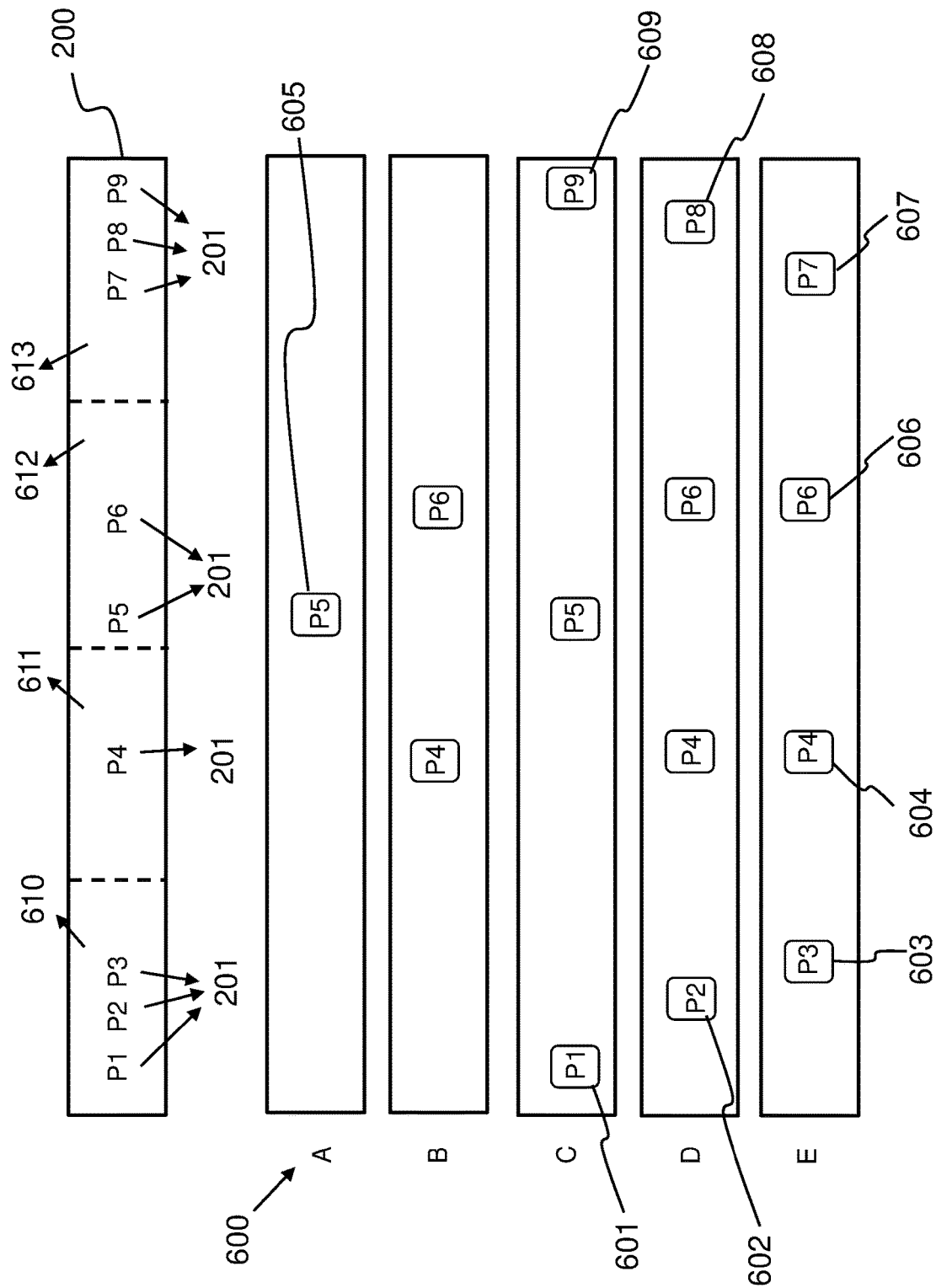
FIG. 6 shows another possible embodiment of a control button according to the invention, and illustrates its appearance in various usage applications.

In FIG. 5 and FIG. 6, two different embodiments are shown of a control button 200 according to the invention, and the view of the control button 200 is illustrated by several usage applications 500 or 600, respectively. In the embodiment of FIG. 5, there are two underlying pressure zones 506, 507 and the control button 200 contains five pictograms 201, such as is also the case in the embodiments of FIG. 2 and FIGS. 3a to 3c. In the embodiment of FIG. 6, there are four underlying pressure zones 610, 611, 612, 613 and the control button 200 contains nine pictograms 201.

In the embodiment of FIG. 5, three different usage applications 500 may be chosen, in the figure indicated with "A", "B" and "C". Analogous to the embodiments of FIGS. 3a to 3c, in the usage application "A", one pictogram 503 lights up centrally on the control button 200. In the usage application "B" or "C", respectively, at the left side of the control button 200 a pictogram 501 or 502, respectively, is illuminated, and at the right side of the control button a pictogram 505 or 504, respectively.

In the embodiment of FIG. 5, three different usage applications 500 may be chosen, in the figure indicated with "A", "B" and "C". Analogous to the embodiments in FIGS. 3a to 3c, in the usage application "A", one pictogram lights up centrally on the control button 200. Therefore, it is immediately clear to the user that there is only one active function, and either pressing the button 200 at the position of zone 506 or zone 507 results in the same control. Thus, the user is shielded from the underlying complexity of the two present pressure zones 506, 507. In the usage application "B" or "C", respectively, at the left side of the control button 200 a pictogram 501 or 502, respectively, is illuminated, and at the right side of the control button a pictogram 505 or 504, respectively. Since both pictograms 501 and 505 or 502 and 504 are shown at opposing ends of the control button 200, it is immediately clear to the user where he should press the control button 200 to perform a certain function.

In the embodiment of FIG. 6, five different usage applications 600 may be chosen, in the figure indicated with "A", "B", "C", "D" and "E". At choosing usage application "A", one pictogram 605 is illuminated centrally on the control button 200. It is immediately clear to the user that there is only one active function, even though there are four underlying pressure zones 610-613. The system will accept a press of the button 200 in the third zone 612 as the selection of the active function. Optionally, the system will also accept a press in the second zone 611 as the selection of the active function. Optionally, the system will furthermore accept a press in the first zone 610 and/or the fourth zone 613 as the selection of the active function.

In the usage application "B", a pictogram 604 is illuminated at the left side of the control button 200, and a pictogram 606 is illuminated at the right side of the control button, wherein both pictograms are distributed evenly over the button 200. The system will accept a press of the button 200 in the second zone 611 as the selection of the function corresponding with pictogram 604. Optionally, the system will also accept a press in the first zone 610 as the selection of the function corresponding with pictogram 604. The system will accept a press in the third zone 612 as the selection of the function corresponding with pictogram 606. Optionally, the system will also accept a press in the fourth zone 613 as the selection of the function corresponding with pictogram 606.

In the usage application "C", pictograms 601, 605 and 609 are illuminated on the button 200, and there are thus three active functions. Pressing the button 200 in the first zone 610 resp. fourth zone 613 results in selecting the active function corresponding with pictogram 601 resp. 609. Pressing the button 200 in the third zone 612 results in selecting the active function corresponding with pictogram 605. Optionally, pressing the button 200 in the second zone 611 also results in selecting the active function corresponding with pictogram 605.

In the usage application "D", pictograms 602, 604, 606 and 608 are illuminated, and in the usage application "E", the pictograms 603, 604, 606 and 607, so that four active functions are visualised. The active function visualised by each of the pictograms is selected by pressing the corresponding underlying pressure zone.

In of the cases "A", "B", "C", "D" and "E", the pictograms are distributed evenly over the control button 200, resulting in a self-evident control by the user. For example, in usage application "A", only the control of the microphone is possible, while in the usage application "D" a microphone and a camera may be controlled by a left or right user, respectively.

The examples shown in FIG. 5 and FIG. 6 illustrate that the number of active functions varies between one and the number of pressure zones 506-507, 610-613, depending on the chosen usage application 500, 600. Each time, the user is shown only the active functions, and is optimally guided in where on the button 200 he should press to perform a function. This results in an optimal ease of use in various usage applications 500, 600. Moreover, the device 100 may, depending on the usage application, be configured such that pressing one specific pressure zone results in a different control. Therefore, the same hardware may be deployed for various usage applications 500, 600.

Although the present invention was illustrated by specific embodiments, it will be clear for the person skilled in the art that the invention is not limited to the details of the foregoing illustrative embodiments, and that the present invention may also be executed with various changes and modifications without thereby departing from the field of application of the invention. The present embodiments should therefore in all aspects be considered as illustrative and not restrictive, wherein the field of application of the invention is described by the attached claims and not by the foregoing description, and all changes falling within the meaning and scope of the claims are therefore also included. In other words, it is understood that all changes, variations or equivalents falling within the application area of the underlying basic principles and of which essential attributes are claimed in this patent application fall herein. Moreover, the reader will understand from this patent application that the words "comprising" or "comprise" do not exclude other elements or steps, that the word "one" does not exclude a plural, and that a single element, such as a computer system, a processor or another integrated unit may fulfil the functions of various tools mentioned in the claims. Optional changes in the claims may not be taken as a limitation of the claims at hand. The terms "first", "second", "third", "a", "b", "c" and the like, when used in the description or in the claims, are used to distinguish between similar elements or steps and do not describe necessarily a consecutive or chronological order. In the same way, the terms "top", "bottom", "over", "under" and the like are used for the purpose of the description and do not refer necessarily to relative positions. It has to be understood that these terms are interchangeable under the right conditions, and that embodiments of the invention are capable of functioning according to the present invention in other orders or orientations than described or illustrated above.

The invention claimed is:

1. A conference device comprising:
   a physical control button having multiple underlying pressure zones,
     wherein multiple pictograms are provided on said control button, and
     wherein at the position of each of the pressure zones, one or more pictograms are provided on said control button;
   a configuration unit adapted to visualize a number of active functions on and/or around said control button based on a chosen usage application,
     wherein said number of active functions is at most equal to the number of said underlying pressure zones,
     wherein visualizing said number of active functions comprises lighting up a respective selection of said pictograms, and
     wherein said configuration unit is adapted to light up one or none of the pictograms at the position of said pressure zone based on said chosen usage application;
   a control unit adapted to control one or more components on the conference device,
     wherein pressing the control button at the position of one of the pressure zones results in a control which depends on the chosen usage application, and
     wherein, in case none of the pictograms lights up at the position of said one of said pressure zones, said control resulting from pressing said one of said pressure zones is the same as the control resulting from pressing an adjacent pressure zone.

2. The conference device according to claim 1, wherein said number of active functions varies between one and the number of said underlying pressure zones, depending on said chosen usage application.

3. The conference device according to claim 1, wherein said pictograms are not visible when they are not lighting up and lighting up said selection of pictograms results in making said selection of said pictograms visible.

4. The conference device according to claim 1, wherein said pictograms are positioned such that said selection of pictograms lighting up is distributed evenly over said control button.

5. The conference device according to claim 1, wherein said conference device is adapted to communicate with a central unit, and
   wherein said control unit is adapted to send a request to said central unit when pressing said control button at the position of one of said pressure zones.

6. The conference device according to claim 5, wherein the content of said request is based on said chosen usage application.

7. The conference device according to claim 5, wherein said control unit is adapted to receive a command from said central unit, based on which said one or more components are controlled.

8. The conference device according to claim 5, wherein said configuration unit is adapted to receive a configuration message from said central unit,
wherein said configuration message comprises said chosen usage application.

9. The conference device according to claim 1, wherein said one or more components belong to the following group: microphone, illumination component, screen, camera, motor.

10. The conference device according to claim 1, wherein the number of said underlying pressure zones is equal to two, and the number of said pictograms is equal to five, of which two are provided at the left side of said control button, two at the right side of said control button, and one centrally on said control button.

11. The conference device according to claim 1, wherein said chosen usage application is representative for a use of said conference device by one participant, or a use of said conference device by two participants, or a use of said conference device by a chairman.

12. The conference device according to claim 10, wherein said configuration unit is adapted
to light up one pictogram centrally on said control button upon said use by one participant, and
to light up one pictogram at the left side and one pictogram at the right side of said control button upon said use by two participants or a chairman.

13. The conference device according to claim 1, wherein the configuration unit is adapted to visualize a number of active functions on said control button based on a chosen usage application.

14. The conference device according to claim 1, wherein the configuration unit is adapted to visualize a number of active functions around said control button based on a chosen usage application.

15. The conference device according to claim 1, wherein the configuration unit is adapted to visualize a number of active functions on and around said control button based on a chosen usage application.

16. The conference device according to claim 1, wherein said chosen usage application is representative for a use of said conference device by two or more participants.

17. The conference device according to claim 1, wherein said chosen usage application is representative for a use of said conference device by a chairman.

* * * * *